(12) United States Patent
Muramoto et al.

(10) Patent No.: US 7,507,381 B2
(45) Date of Patent: Mar. 24, 2009

(54) EXHAUST GAS TREATING APPARATUS

(75) Inventors: Kouji Muramoto, Kure (JP); Takayuki Saitou, Kure (JP); Hiromichi Shimazu, Kure (JP); Takanori Nakamoto, Kure (JP); Toshio Katsube, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 308 days.

(21) Appl. No.: 10/530,471

(22) PCT Filed: Oct. 30, 2003

(86) PCT No.: PCT/JP03/13904

§ 371 (c)(1),
(2), (4) Date: Apr. 6, 2005

(87) PCT Pub. No.: WO2004/042280

PCT Pub. Date: May 21, 2004

(65) Prior Publication Data

US 2006/0008394 A1  Jan. 12, 2006

(30) Foreign Application Priority Data

Nov. 5, 2002 (JP) ............................. 2002-321448

(51) Int. Cl.
*F01N 3/10* (2006.01)
(52) U.S. Cl. ..................................... 422/173
(58) Field of Classification Search ................ 422/168, 422/169; 165/153; 423/240, 242.1
See application file for complete search history.

(56) References Cited

U.S. PATENT DOCUMENTS 6,096,279 A * 8/2000 Iwashita et al. .......... 423/242.1

FOREIGN PATENT DOCUMENTS

| JP | 61-159004 | 7/1986 |
|---|---|---|
| JP | 10-202048 | 10/1997 |
| JP | 2002-317919 | 8/1998 |
| JP | 2000-161647 | 6/2000 |
| JP | 2000-304238 | * 11/2000 |
| JP | 2000-320998 | * 11/2000 |
| JP | 9-280540 | 10/2002 |

OTHER PUBLICATIONS

English Language Abstract of JP 2000-161647.
English Language Abstract of JP 2002-317919.
English Language Abstract of JP 10-202048.
English Language Abstract of JP 9-280540.
U.S. Appl. No. 10/523,033 to Okamoto et al., which was filed on Feb 2, 2005.
English Language Abstract of JP 61-159004.

* cited by examiner

*Primary Examiner*—Tom Duong
(74) *Attorney, Agent, or Firm*—Greenblum & Bernstein, P.L.C.

(57) ABSTRACT

An exhaust gas processing device includes an air preheater for preheating air for combustion in a combustion device by using an exhaust gas emitted from the combustion device; a gas-gas heater heat recovery device composed of a heat transfer tube for recovering the heat of the exhaust gas to a heat medium; a dust collector; a wet-type desulfurization device; a gas-gas heater re-heater composed of a heat transfer tube for heating the exhaust gas at its outlet by using the heat medium supplied from the gas-gas heater heat recovery device, which are installed in that order from the upstream to the downstream of an exhaust gas duct of the combustion device.

6 Claims, 14 Drawing Sheets

(a)

(b) Number of stage of tubes ≦ 8

(c)

(a)

(b)

(a)

(b)

(a)

(b)

(a)

(b)

EXHAUST GAS TREATING APPARATUS

TECHNICAL FIELD

The present invention relates to an exhaust gas processing device (also referred to as a flue gas processing device) provided with a gas-gas heat exchanger suitable for exhaust gas re-heating, such as a boiler at the outlet of a wet-type desulfurization device.

BACKGROUND ART

General exhaust gas processing systems are shown in FIG. 15, FIG. 10, and FIG. 11. In the exhaust gas processing system shown in FIG. 15, the exhaust gas containing a large amount of dust emitted from a combustion device such as a boiler 1 using coal as fuel is introduced to a denitration device 2 in which nitrogen oxide contained in the exhaust gas is removed. Then in an air preheater 3, the exhaust gas is heat-exchanged with air for combustion which is supplied to the boiler 1. After most of the dust in the exhaust gas is removed in a dust collector 5 (including a bag filter and an electric static precipitator in the present specification), the exhaust gas is pressurized up by an induced draft fan 6. Sequently, the exhaust gas is introduced to a gas-gas heater (GGH) heat recovery device 4 in which heat is recovered, and then introduced to a wet-type desulfurization device 7 in which sulfur oxide (SOx) contained in the exhaust gas is removed by gas-liquid contacted with the absorber containing a desulfuring agent. The exhaust gas cooled down to the saturated gas temperature in the wet-type desulfurization device 7 is pressurized up by the desulfuring fan 9, heated by a GGH re-heater 8, and emitted from a smokestack 10. Between the GGH heat recovery device 4 and the GGH re-heater 8 are provided interconnecting lines 13 in which a heat medium circulates.

The other exhaust gas processing systems are shown in FIG. 10 and FIG. 11, and their GGH (gas-gas heater) systems are shown in FIGS. 12 and 13. In these drawings, the same components are referred to with the same reference numbers.

In FIG. 10, the exhaust gas from the boiler 1 is flown through an exhaust gas duct 30, introduced to the denitration device 2 in which nitrogen oxide in the exhaust gas is removed, and in the air preheater 3, is heat-exchanged with air for combustion to be supplied to the boiler 1. Next, the exhaust gas is introduced to the GGH heat recovery device 4 in which the exhaust gas is heat-exchanged with the heat medium flowing through the heat recovery device 4, thereby decreasing the temperature of the exhaust gas and also decreasing the electric resistance value of the dust in the exhaust gas. In this condition, the exhaust gas is introduced to an electric static precipitator 5 in which most of the dust in the exhaust gas is removed. Sequently, the exhaust gas is pressurized up by the induced draft fan 6, introduced to the wet-type exhaust gas desulfurization device 7, and subjected to gas-liquid contact with a desulfuring agent-containing liquid so as to remove SOx and part of the dust in the exhaust gas. The exhaust gas cooled down to the saturated gas temperature in the wet-type desulfurization device 7 is heated by the GGH re-heater 8 by a heat exchange with the heat medium supplied from the heat recovery device 4, pressurized up by the desulfuring fan 9, and emitted from the smokestack 10.

FIG. 11 shows a system where there is a wet-type dust collector 19 added between the wet-type exhaust gas desulfurization device 7 and the GGH re-heater 8 in the exhaust gas duct 30 in order to further reduce the dust contained in the exhaust gas at the outlet of the wet-type exhaust gas desulfurization device 7.

In the exhaust gas processing systems shown in FIG. 10 and FIG. 11, the duct collector 5 is installed at a side down stream of the GGH heat recovery device 4 in the exhaust gas duct 30, which results in a decrease in the temperature of the processing gas in the dust collector 5, thereby decreasing the electric resistance of the dust and increasing the efficiency of removing the dust. Thus, it has a high dust removing performance, compared with the exhaust gas processing system shown in FIG. 15.

Since dust emission controls are becoming stricter recently, the exhaust gas processing systems shown in FIG. 10 and FIG. 11 have become main stream processing systems for exhaust gas which contains a large amount of dust emitted from a boiler or the like using coal as fuel.

Next, the GGH systems of the exhaust gas processing systems shown in FIG. 10 and FIG. 11 will be described with reference to FIG. 12 and FIG. 13.

The heat transfer tubes 11 in the GGH heat recovery device 4 and the heat transfer tubes 12-2 in the GGH re-heater 8 are connected with each other via the interconnecting lines 13 where the heat medium is circulated by a heat medium circulation pump 14. In the heat medium circulation system, there is a heat medium tank 15 installed for absorbing the expansion of the heat medium in the system, and there is also a heat medium heater 16 for controlling the temperature of the heat medium so as to keep the operation of the boiler or the like stable. The steam drain generated in the heat medium heater 16 is recovered by a heat medium heater drain tank 17, and then transferred to a boiler-side tank (not illustrated).

The heat transfer tubes 11 of the GGH heat recovery device and the heat transfer tubes 12-2 of the GGH re-heater are generally composed of fin-equipped heat transfer tubes in order to improve the efficiency of heat exchange. Furthermore, on the stage preceding the GGH re-heater 8 is provided a bare tube 12-1 consisting of at least three stages of bare heat transfer tubes with no fins in order to remove (evaporate) corrosive mist scattering from the wet-type exhaust gas desulfurization device 7.

Such a structure is disclosed in Japanese Published Unexamined Patent Application No. 2000-161647 in which the heat medium circulating through the GGH heat recovery device 4 and the re-heater 8 is flown into the bare tube 12-1 so as to increase the surface temperature of the bare tube, thereby removing the scattering mist.

FIG. 13 shows a system configuration where there is a SGH (steam gas heater) 20 installed as the heat transfer tubes composed of the bare tube installed in the stage preceding the fin-equipped heat transfer tubes 12-2 of the GGH re-heater 8 in the system shown in FIG. 12, and steam is introduced to the SGH 20 from outside. The steam drain generating in the SGH 20 is recovered by a SGH drain tank 18 and then transferred to a boiler-side tank (not illustrated).

FIG. 14 shows a simplified side view (FIG. 14(a)) and a cross sectional view taken along the line A-A (FIG. 14(b)) in the case where soot blowers 21 are installed as dust removers for the GGH.

The soot blowers 21 used in the GGH are generally kept inside the exhaust gas duct 30 because the exhaust gas temperature in the GGH is low (160° C. or lower). When the soot blowers 21, which are supplied with steam or air, are in operation, the tubes inserted in the soot blowers 21 go back and forth while rotating (moving vertically in the case shown in FIG. 14), and during movement, steam or air is jetted from the holes formed in the tubes, thereby removing dust and the like accumulated in the heat transfer tubes (fin-equipped heat transfer tubes) 11 and 12-2 of the GGH.

In general, in a heat exchanger with GGH heat transfer tubes (fin-equipped heat transfer tubes), the heat transfer performance of the heat exchanger can be improved by increasing the flow rate of the gas which passes through the heat transfer tube region, thereby reducing the total heat transfer area.

Diminishing the fin pitch of the fin-equipped heat transfer tubes used as the heat transfer tubes (in general, the fin pitch is not more than 5.08 mm) can increase the heat transfer area per heat transfer tube, so as to reduce the number of heat transfer tubes installed in the whole heat exchanger, thereby reducing the size of the heat exchanger.

However, in the aforementioned exhaust gas processing system provided with the GGH, the exhaust gas introduced to the GGH heat recovery device 4 installed at a side down stream of the air pre-heater 3 (a side upper stream of the dust collector 5) in the exhaust gas duct 30 contains a large amount of dust (10 to 50 $g/m^3N$ or so). This causes a problem of abrasion (due to ash erosion) over time with the heat transfer tubes 11 of the GGH heat recovery device 4 and their fins, and also the problem of clogging of the regions between the adjacent fins as a result that the dust and $SO_3$ contained in the exhaust gas adhere to the heat transfer tubes 11.

In the GGH re-heater 8 installed at a side down stream of the wet-type exhaust gas desulfurization device 7 in the exhaust gas duct 30, the dust collector 5 and the wet-type exhaust gas desulfurization device 7 remove dust, so its amount is reduced to approximately 20 $mg/m^3N$ or lower. Consequently, in the GGH re-heater 8, the abrasion (ash erosion) environment due to the dust is mitigated. However, there are still other problems as follows. The sulfur oxide absorber containing plaster slurry and the like and mist containing a corrosive ingredient which scatters from the devices (the wet-type exhaust gas desulfurization device 7 and the wet-type dust collector 19) installed at a side down stream of the GGH re-heater 8 collide with the fin-equipped heat transfer tubes 12-2 of the GGH re-heater 8, thereby corroding the fin-equipped heat transfer tube 12-2. In addition, the dust adhered to the fins over time clogs the regions between the adjacent fins and between the adjacent heat transfer tubes where the gas flows.

In general, the soot blowers 21 or the like are installed as GGH dust removers, and for effective dust removal of the heat transfer tubes composing the GGH, it is necessary to take some measures, such as increasing the number of soot blowers 21 or increasing the frequency of activating the soot blowers 21.

Normally, the soot blowers 21 are activated (timer control) at a frequency of 3 to 5 times a day. Since the operation of the soot blowers 21 is controlled at a frequency of activation based on the worst conditions assumed in consideration of the problems that the dust adheres to the fins of the fin-equipped heat transfer tubes and clogs the regions between the adjacent fins and between the adjacent heat transfer tubes where the gas flows, an excessive amount of steam tends to be introduced to the duct 30.

Therefore, the object of the present invention is to provide an exhaust gas processing device provided with heat transfer tubes for the GGH heat recovery device and the GGH re-heater, which are structured to solve the aforementioned problems in consideration of the environment with a large amount of dust where the GGH is installed.

DISCLOSURE OF THE INVENTION

The aforementioned object of the present invention is solved by the following constitutions. Namely an exhaust gas processing device comprising: an air preheater for preheating air for combustion in a combustion device by using an exhaust gas emitted from the combustion device; a gas-gas heater heat recovery device composed of a heat transfer tube for recovering the heat of the exhaust gas at the outlet of the air preheater to a heat medium; a dust collector for collecting dust in the exhaust gas at the outlet of the gas-gas heater heat recovery device; a wet-type desulfurization device for removing sulfur oxide in the exhaust gas at the outlet of the dust collector; a gas-gas heater re-heater composed of a heat transfer tube for heating the exhaust gas at the outlet of the wet-type desulfurization device by using the heat medium supplied from the gas-gas heater heat recovery device, which are arranged in that order from the upstream side to the downstream side of an exhaust gas duct of the combustion devices; and a heat medium circulation line for connecting heat transfer tubes provided in each of the gas-gas heater heat recovery device and the gas-gas heater re-heater and for circulating the heat medium through the heat transfer tubes, wherein the heat transfer tube of the gas-gas heater heat recovery device is squarely arranged in the gas flow direction in such a manner that the inter-tube flow rate, which is the flow rate of the exhaust gas between the heat transfer tubes adjacent in the direction orthogonal to the gas flow direction, can be 10 m/s or lower.

The exhaust gas processing device is also able to structured in such a manner that the dust collector of the wet type is disposed in the exhaust gas duct between the wet-type desulfurization device and the gas-gas heater re-heater.

It is preferable that at least some of the heat transfer tubes of the gas-gas heater are composed of fin-equipped heat transfer tubes; the fin pitch of the heat transfer tubes of the gas-gas heater heat recovery device is set to 7.25 to 10.16 mm; and the fin pitch of the heat transfer tubes of the gas-gas heater re-heater is set to 6.35 to 8.47 mm, and it is also preferable that at least three stages of heat transfer tubes composed of a bare tube are installed on the stage preceding the fin-equipped heat transfer tubes of the gas-gas heater re-heater; and that the bare tube is a staggered arrangement in the gas flow direction so that the inter-tube flow rate, which is the flow rate of the exhaust gas between the heat transfer tubes adjacent in the direction orthogonal to the gas flow direction, cannot be more than 12 to 16 m/s.

The heat transfer tubes composed of the bare tube installed in the stage preceding the fin-equipped heat transfer tubes of the gas-gas heater re-heater can be either made a part of the heat medium circulation line for circulating the heat medium through the gas-gas heater heat recovery device and the gas-gas heater re-heater, or made a steam line for flowing steam that is installed separately from the heat medium circulation line.

It is also preferable that the heat transfer tubes of the gas-gas heater heat recovery device are tied in bundles each having a prescribed number of heat transfer tubes; the bundles are each composed of heat transfer tubes of not more than eight stages arranged in the gas flow direction and have a width of 3000 mm or less in the direction orthogonal to the gas flow direction, and in front and in back of the bundles in the gas flow direction are installed dust removers.

The exhaust gas processing device can be also structured in such a manner that either the gas-gas heater heat recovery device or the gas-gas heater re-heater is provided with dust removers; differential pressure gauges and/or thermometers are provided in front and in back of the bundles in the gas flow direction; and control devices are provided to initiate the dust removers when the measured values of the differential pressure gauges and/or the thermometers become prescribed values or higher or lower.

The problems on the GGH heat recovery device 4 side, which are the abrasion of the fin-equipped heat transfer tubes 11 due to ash and clogging of the fin-equipped heat transfer tube parts 11, can be solved by defining the specification of the GGH heat recovery device 4 as follows.

In the exhaust gas processing system shown in FIG. 15, it is unnecessary to take measures against the abrasion of the GGH heat transfer tubes because the GGH heat recovery device 4 is installed at a side down stream of the dust collector 5 in the exhaust gas duct 30, and a heat exchange is performed in the GGH heat recovery device 4 by using the exhaust gas after most of the dust has been captured by the dust collector 5. However, as mentioned earlier, in recent years, the exhaust gas processing systems shown in FIG. 10 and FIG. 11 have become mainstream processing systems because of their higher dust removing efficiencies than the exhaust gas processing system shown in FIG. 15.

However, as shown in FIG. 10 and FIG. 11, since the GGH heat recovery device 4 is installed at a side upper stream of the dust collector 5, the exhaust gas introduced to the GGH heat recovery device 4 contains a large amount of dust (10 to 50 g/m$^3$N or so), with concern that the heat transfer tubes may be seriously worn. In general, the amount of abrasion of the heat transfer tubes is affected by the gas flow rate, the dust concentration, and the like in the exhaust gas. Although it depends on the specification of the fin-equipped heat transfer tubes, in order to use fin-equipped heat transfer tubes as a GGH, it is generally preferable that the abrasion rate in practice is approximately 0.1 mm/year or less as indicated by the abrasion limit line A shown in FIG. 6.

As a result of studies regarding methods for preventing the abrasion of the heat transfer tubes of the GGH heat recovery device in the case where the GGH heat recovery device is installed at a side upper stream of the dust collector, the inventors of the present invention have found a relationship between the abrasion amount of the GGH heat transfer tubes, the gas flow rate, and the dust concentration in the gas.

To be more specific, as shown in FIG. 6, it has been confirmed that the installment of the GGH heat recovery device at a side upper stream of the dust collector causes an increase in the amount of abrasion of the heat transfer tubes with increasing gas flow rate. However, to our surprise, it has been found that at a gas flow rate of 10 to 11 m/s or more, the amount of abrasion rapidly increases, regardless of the level of dust concentration in the exhaust gas.

Therefore, as a precaution against ash erosion due to the dust contained in the gas, the inter-tube flow rate of the gas which passes through the heat transfer tubes (fin-equipped heat transfer tubes) of the GGH heat recovery device is regulated at 10 m/s or lower, which makes it possible to prevent abrasion of the heat transfer tubes of the GGH heat recovery device, while keeping the dust removing efficiency high.

The term the inter-tube flow rate in the fin-equipped heat transfer tubes indicates, in the horizontal cross sectional view of the heat transfer tubes shown in FIG. 1(a), the flow rate of the gas passing through the space cross sectional region, which is obtained by subtracting the total cross sectional areas of the heat transfer tubes 11a, 12-2a of the fin-equipped heat transfer tubes 11 and 12-2 shown in FIG. 12 and FIG. 13 and the fins 11b and 12-2b orthogonally crossing the direction G of the gas flow from the cross sectional area of the duct orthogonally crossing the direction G of the gas flow on the center axis L of the heat transfer tubes on the first stage in the gas flow direction.

FIG. 7 shows the comparative data of the pressure loss ratios of gas flow in the case where fin-equipped heat transfer tubes which differ in fin pitch are arranged for three days in processing gas flows which differ in dust concentration, including zero dust concentration. In the case where the heat transfer tubes are bare tubes without fins, the pressure losses are nearly fixed when the gases pass through the heat transfer tubes, regardless of the dust concentration. On the other hand, in the case of the fin-equipped heat transfer tubes, dust tends to clog the regions between the adjacent fins as the fin pitch decreases, which greatly contributes to an increase in the pressure loss of the gas flow and a decrease in the heat transfer performance of the heat transfer tubes.

In general, in the heat exchanger provided with the fin-equipped heat transfer tubes, the heat transfer area per heat transfer tube increases with decreasing fin pitch. Therefore, the total number of heat transfer tubes installed in the GGH for provision of the heat transfer area necessary for the heat exchange can be reduced. Consequently, when the processing gas is a clean gas (contains no dust at all), the fin pitch is generally set in the range of 5.08 mm or lower from an economic standpoint.

However, since the processing gas contains dust and the like, it is necessary to set the fin pitch of the fin-equipped heat transfer tubes 11 and 12-2 of the GGH heat recovery device 4 and the GGH re-heater 8 at an appropriate value. As shown in FIG. 7, in an environment involving processing gas which contains dust and the like, the optimum application range of the fin pitch is determined by taking into consideration that the cross sectional area of the exhaust gas duct decreases over time due to adhesion of dust on the heat transfer tubes, and consequently the pressure loss of the gas flow while the gas passes through the heat transfer tubes increases over time.

To be more specific, for the purpose of preventing clogging of the fin-equipped heat transfer tubes due to adhesion of soot dust and the $SO_3$ and the like contained in the exhaust gas, and improving the dust removing effects of the dust removers such as the soot blowers 21, the fin-equipped heat transfer tubes of the GGH heat recovery device 4 are squarely arranged, and the fin pitch of the heat transfer tubes of the GGH heat recovery device 4 is set to 7.25 to 10.16 mm.

The term, fine pitch indicates the interval F of the adjacent independent fins of the heat transfer tubes shown in FIG. 1(b) which is a partial side view of the heat transfer tubes, or the pitch F of the fins wound around the heat transfer tubes shown in FIG. 1(c).

FIG. 8 is a view showing changes over time in pressure loss (ΔP) of the exhaust gas flow in the GGH heat transfer tube region. The pressure loss in the heat transfer tube region tends to increase gradually over time. As shown in FIG. 8(a), when the number of stages of the heat transfer tubes in the gas flow direction is eight or lower, the pressure loss can be recovered nearly to the initial value by operating the soot blowers at the timing indicated with S/B in FIG. 8. On the other hand, when there are more than eight stages of heat transfer tubes as shown in FIG. 8(b), the initial pressure loss cannot be recovered when the soot blowers are operated. In general, a GGH is composed of a necessary number of bundles of heat transfer tubes for heat exchange, and the same tendency is seen in the case where the bundles of the heat transfer tubes are installed in a width not less than 3000 mm (the width in the direction orthogonal to the gas flow).

Consequently, in the structure of the heat transfer tubes of the GGH heat recovery device 4, for the purpose of improving the dust removing performance of the soot blowers 21 which are dust removers, the size of the bundles is defined in such a manner as to have eight or less stages in the gas flow direction and to be 3000 mm or less in the width direction, and the soot blowers 21 are installed in front and in back of the bundles in the gas flow direction.

On the other hand, the dust concentration in the exhaust gas flown into the GGH re-heater 8 installed at a side down stream of the wet-type exhaust gas desulfurization device 7 is as small as 20 mg/m$^3$N or lower, which makes it unnecessary to take ash erosion into consideration, and the gas flow rate is limitless. As a result, an appropriate gas flow rate can be selected from the relationship with the pressure loss of the exhaust gas passing through the heat transfer tube region of the GGH re-heater 8. However, in the GGH re-heater 8, the absorber-containing mist scattering from the devices (the desulfurization device 7 and the wet-type dust collector 19) installed at a side down stream of the GGH re-heater 8 in the duct 30 collide with the fin-equipped heat transfer tubes 12-2, with concern that the fin-equipped heat transfer tube 12-2 may be corroded.

FIG. 9 shows the relationship between the inter-tube gas flow rate, the pressure loss, and the mist removing performance of the bare tubes 12-1 of the GGH re-heater 8.

The mist removing performance and the pressure loss of the gas flow in the heat transfer tube region depend on the gas flow rate, and with an increase in the gas flow rate, both the mist removing rate (solid line a) and the aforementioned pressure loss ratio (broken line b) increase.

It is necessary that the mist removing rate is not less than 60%, and it has been confirmed that the mist removing rate has nearly a fixed value when the gas flow rate is 16 m/s or over. This is because the mist scattering from the wet-type exhaust gas desulfurization device 7 is removed by colliding with the bare tube due to inertial impaction; however, mist particles with a diameter smaller than a certain value follow the exhaust gas flow, without colliding with the bare tube.

In general, the amount of mist at the inlet of the GGH re-heater 8 (the outlet of the wet-type exhaust gas desulfurization device 7) is 100 to 150 mg/m$^3$N or so. In order to mitigate the corrosion environment in the fin-equipped heat transfer tubes 12-2 of the GGH re-heater 8 and to perform a stable operation in such conditions, it is generally preferable that the mist removing efficiency rate is 60% or higher. As a result, it has been confirmed that the most effective application range of the bare tubes 12-1 of the GGH re-heater 8 is in an inter-tube gas flow rate of 12 to 16 m/s.

Therefore, at least three stages of heat transfer tubes (bare tubes) 12-1 are a staggered arrangement in the gas flow direction on the stage preceding the fin-equipped heat transfer tubes 12-2 of the GGH re-heater 8, and the inter-tube flow rate of the bare tubes 12-1 is defined in the range of 12 to 16 m/s.

By installing the bare tubes 12-1 and setting the fin pitch of the fin-equipped heat transfer tubes 12-2 of the GGH re-heater 8 to 6.35 to 8.47 mm, clogging of dust in the fin-equipped heat transfer tubes 12-2 over time and other problems can be solved, thereby realizing a more stable operation.

The inter-tube flow rate of the bare tubes 12-1 indicates, in the arrangement of the heat transfer tubes shown in the plan view of FIG. 2, the flow rate of the gas passing through the projected cross sectional area, which is obtained by subtracting the projected cross sectional area of the bare tubes 12-1 from the cross sectional area of the duct on the center axis L of the bare tubes 12-1 on the first stage in the gas flow direction.

In the case where soot blowers are installed as the dust removers of the GGH heat recovery device or the GGH re-heater, it is possible to operate the soot blowers when necessary by providing means for measuring differential pressure values or temperatures in front and in back of each of the heat transfer tube bundles of the GGH heat recovery device or the GGH re-heater in the gas flow direction, and by activating the soot blowers when the differential pressure values or the temperatures become prescribed values or higher (or lower), thereby preventing the soot blowers from using an excessive amount of steam.

BEST MODE FOR CARRYING OUT THE INVENTION

Figure 10:
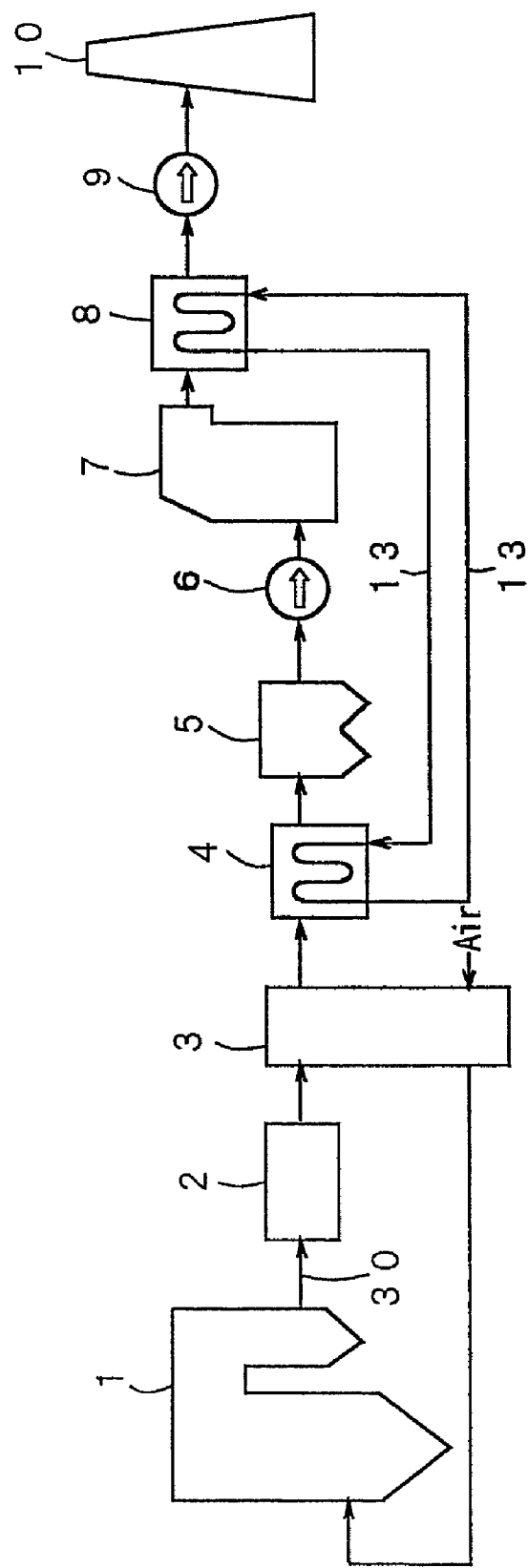
FIG. 10 shows a general exhaust gas processing system.
Figure 11:
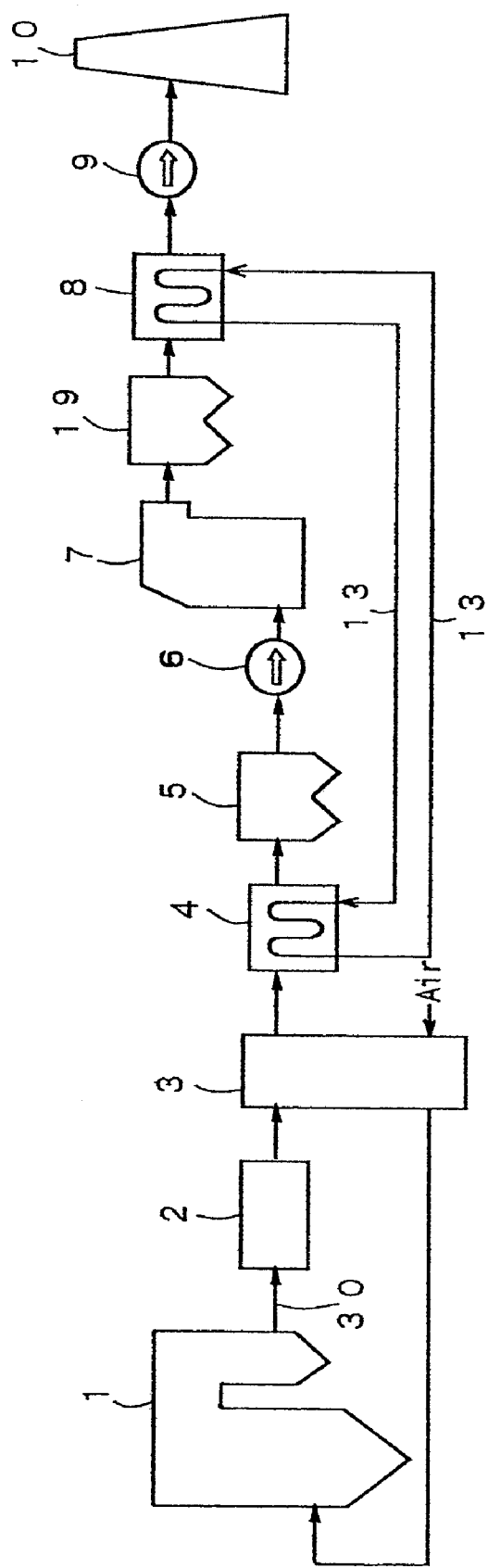
FIG. 11 shows a general exhaust gas processing system in the case where a SGH is installed.
Figure 12:
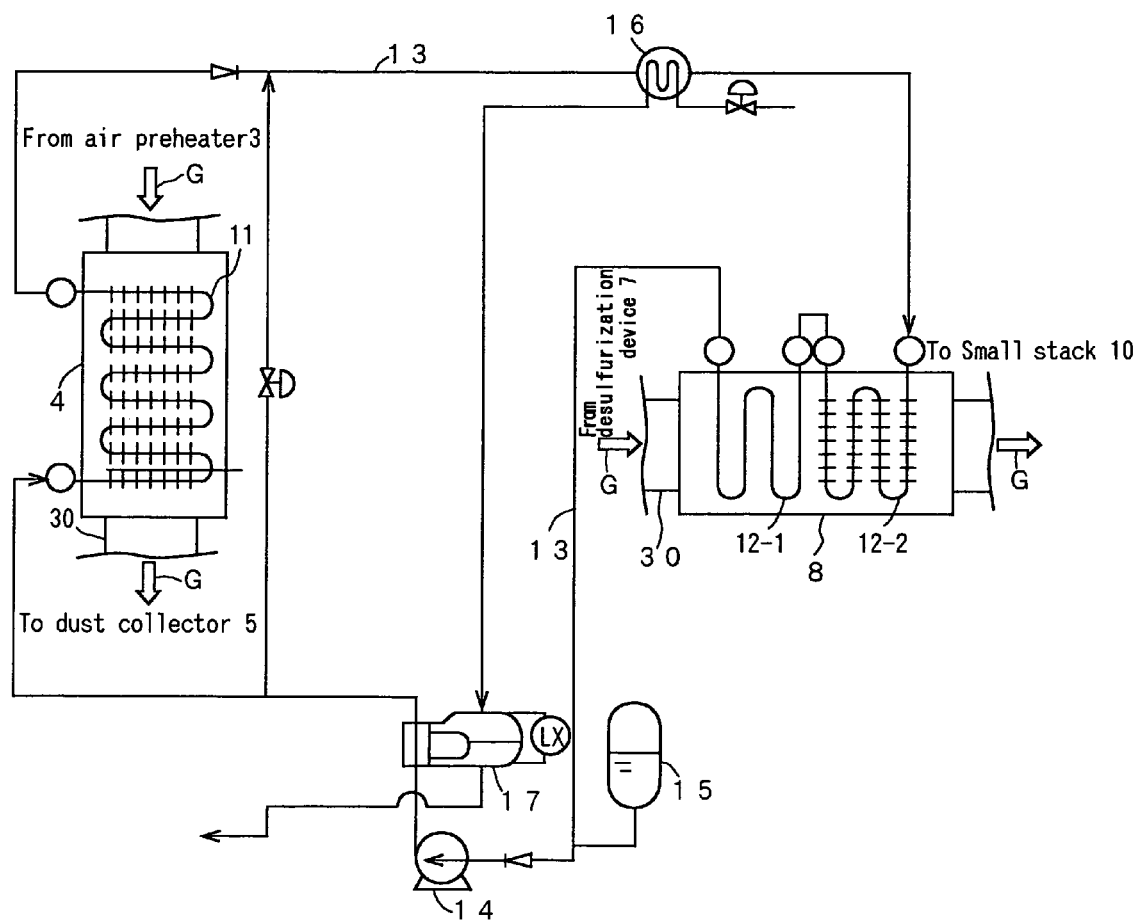
FIG. 12 shows a general system in the vicinity of the GGH.
Figure 13:
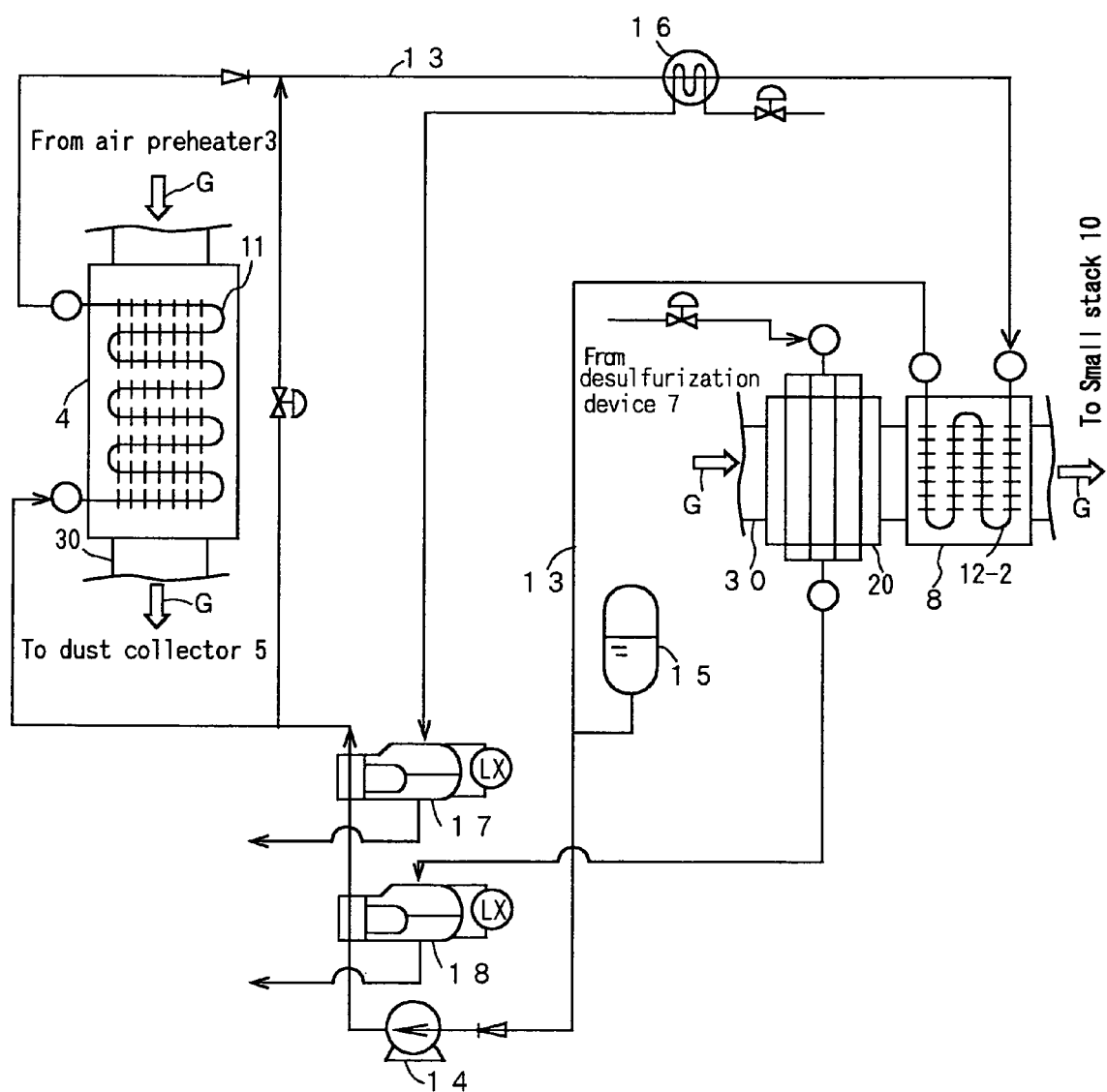
FIG. 13 shows a general system in the vicinity of the GGH in the case where a SGH is installed.
Figure 14:
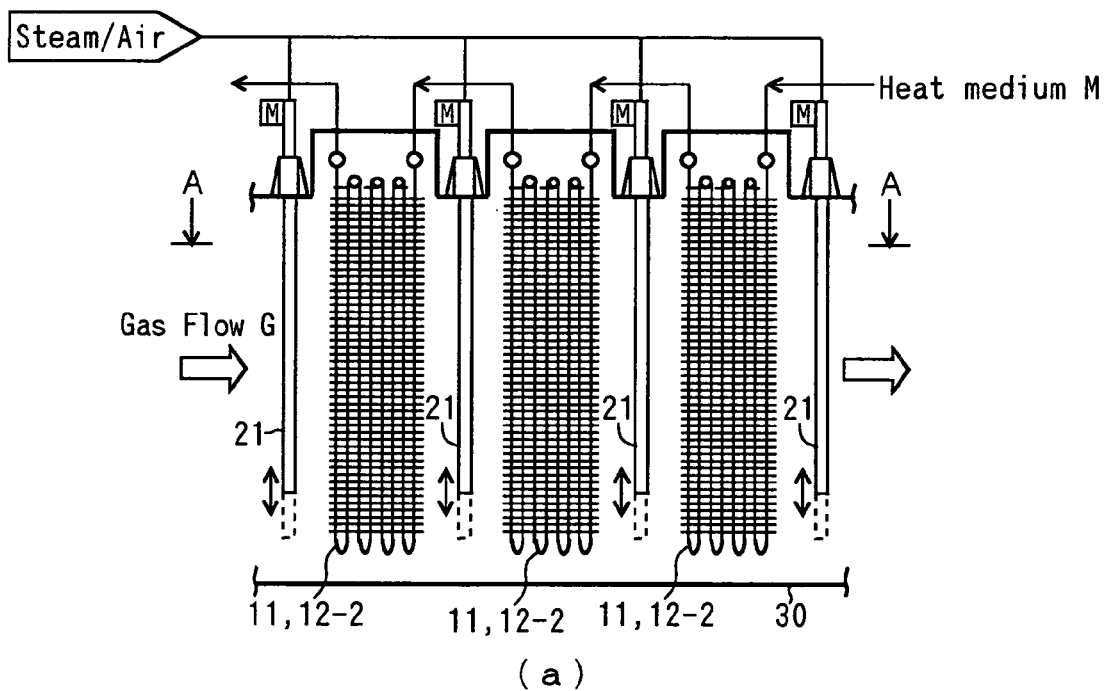
FIG. 14 shows a simplified side view when soot blowers are installed as dust removers (FIG. 14(*a*)) and a cross sectional view taken along the line A-A of FIG. 14(*a*) (FIG. 14(*b*)).
Figure 14:
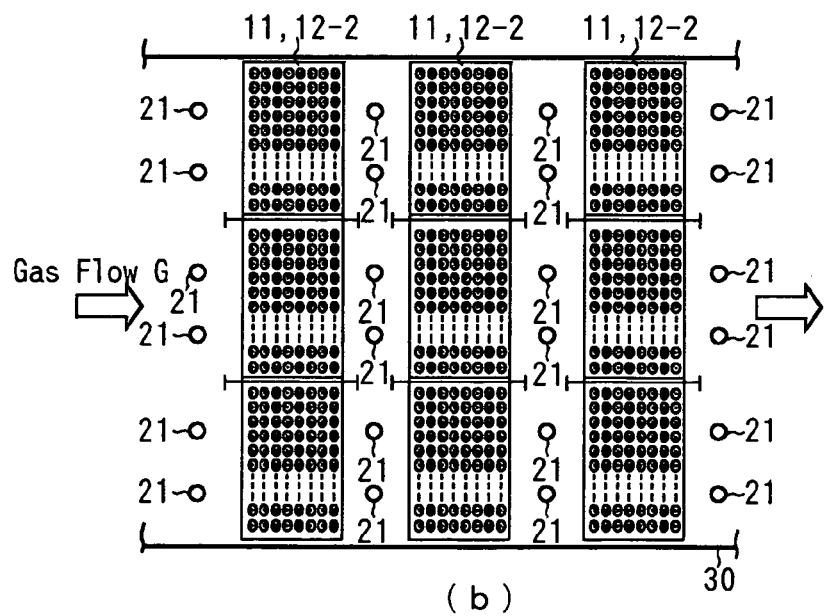
Figure 15:
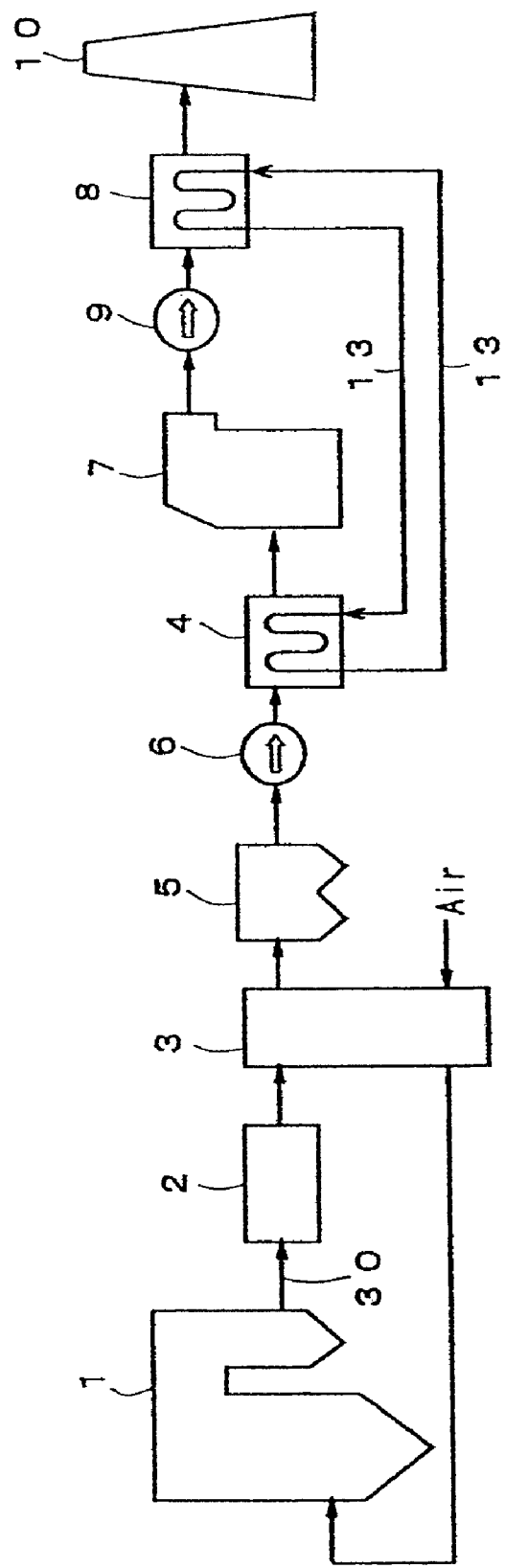
FIG. 15 shows a conventional general exhaust gas processing system.

The embodiment of the present invention will be described with reference to the drawings as follows. The embodiment of the present invention utilizes the exhaust gas processing systems shown in FIG. 10 and FIG. 11 and the GGH (gas-gas heater) systems shown in FIG. 12 and FIG. 13.

Figure 1:
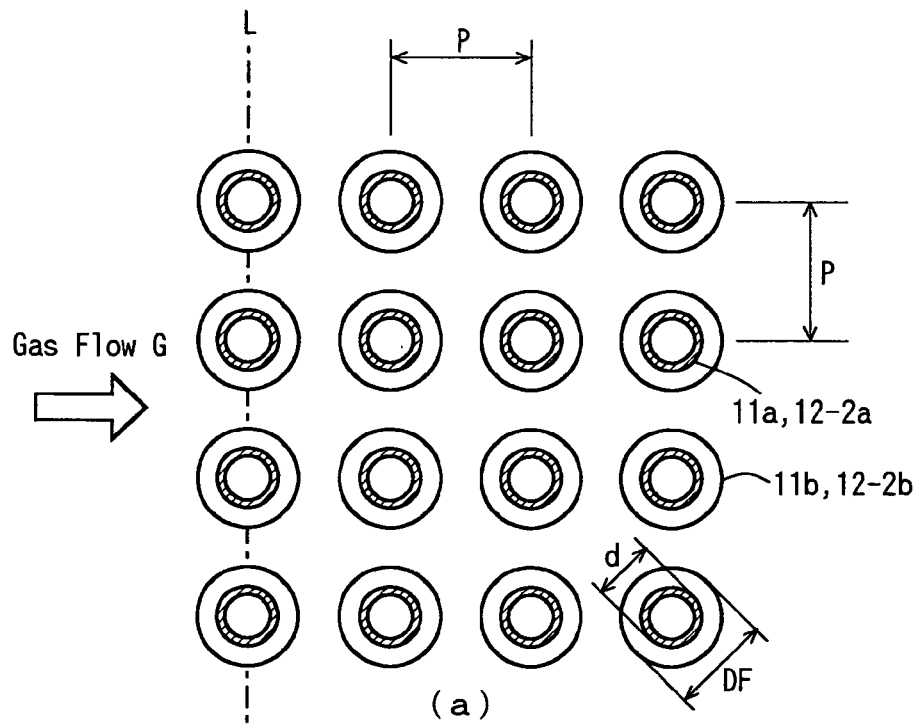
FIG. 1 shows the specification of the GGH heat transfer tubes of the embodiment of the present invention.
Figure 1:
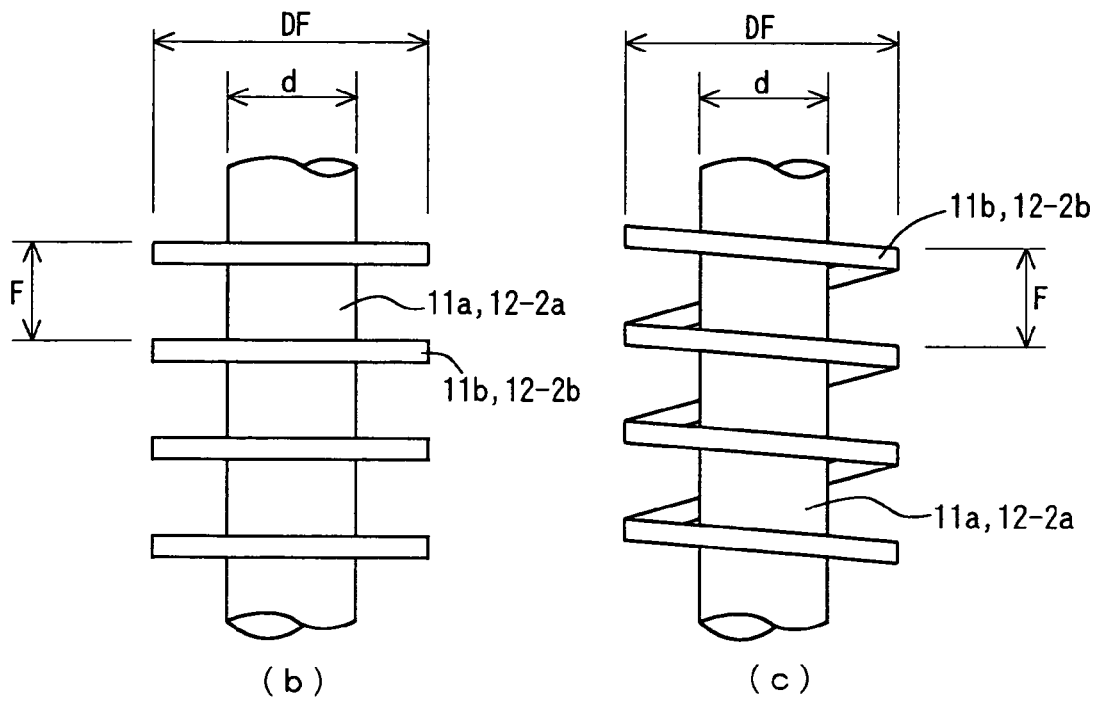

FIG. 1 shows the specification of the heat transfer tubes (fin-equipped heat transfer tubes) 11 and 12-2 respectively used in the GGH heat recovery device 4 and the re-heater 8 of the present embodiment. As shown in the horizontal cross sectional view of the heat transfer tubes of FIG. 1(*a*), the heat transfer tubes (fin-equipped heat transfer tubes) 11 of the GGH heat recovery device 4 are squarely arranged in the gas flow direction, and the fin pitch of the fin-equipped heat transfer tubes 11 is set at 7.25 to 10.16 mm. Furthermore, the heat transfer tubes 11 are arranged in such a manner that the gas passes through the fin-equipped heat transfer tubes 11 of the GGH heat recovery device 4 at an inter-tube flow rate of 10 m/s or lower.

The fin pitch of the fin-equipped heat transfer tubes 12-2 of the GGH re-heater 8 is set to 6.35 to 8.47 mm.

Table 1 shows typical values of the inter-tube flow rate, diameter, and pitch of the heat transfer tubes, and the diameter and pitch of the fins in the fin-equipped heat transfer tubes 11 and 12-2.

TABLE 1

|  | heat recovery device | re-heater |
|---|---|---|
| inter-tube flow rate V (m/s) | ≦10 | — |
| heat transfer tube diameter d (mm) | 30 to 40 | 30 to 40 |
| fin diameter DF (mm) | 60 to 80 | 60 to 80 |
| heat transfer pitch P (mm) | 90 to 120 | 90 to 120 |
| fin pitch | 7.25 to 10.16 | 6.35 to 8.47 |

Figure 2:
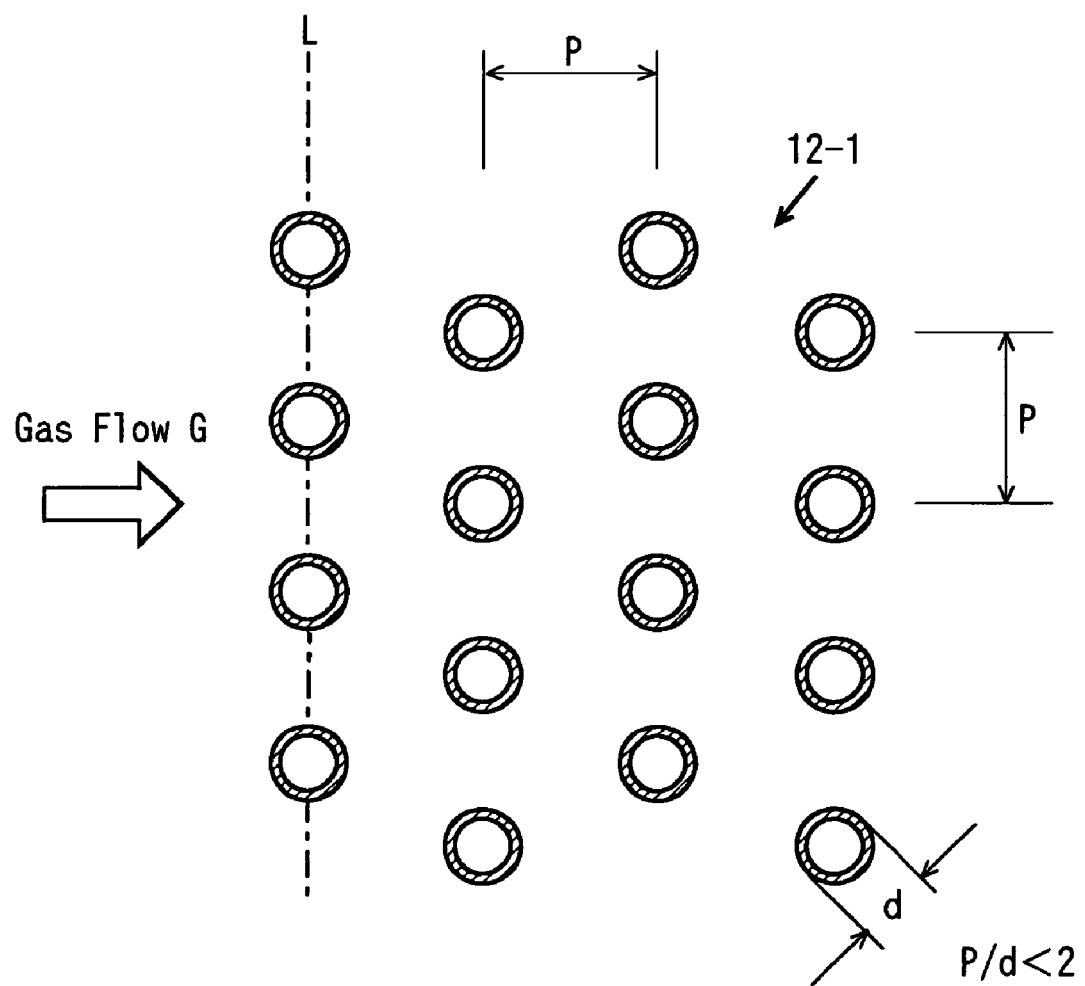
FIG. 2 shows the specification of the bare tube at a side upper stream of the fin-equipped tubes of the GGH re-heater of the embodiment of the present invention.

FIG. 2 shows the horizontal cross sectional view of the heat transfer tubes (bare tubes) 12-1 to be installed in the stage preceding the GGH re-heater 8 according to the present invention. As shown in the horizontal cross sectional view of FIG. 2, on the stage preceding the GGH re-heater 8 are provided at least three stages of heat transfer tubes (bare tubes) 12-1 in a staggered arrangement in the gas flow direction. By setting the inter-tube flow rate of the gas passing through the heat transfer tubes (bare tubes) 12-1 in the range of 12 to 16 m/s, 60% or more of the mist scattering from the devices on the upper side can be removed effectively, thereby mitigating the corrosive environment of the fin-equipped heat transfer tubes 12-2 of the GGH re-heater 8. In this case, the heat transfer tubes (bare tubes) 12-1 are in a staggered arrangement so as to make P (heat transfer tube pitch)/d (heat transfer tube diameter)<2 for the purpose of improving the evaporating efficiency of the mist.

Table 2 shows typical values of the inter-tube flow rate, heat transfer tube diameter, heat transfer tube pitch, and number of stages of the heat transfer tubes (bare tubes) 12-1 used in the GGH re-heater 8.

TABLE 2

|  | a bare tube |
|---|---|
| inter-tube flow rate V (m/s) | 12 to 16 |
| heat transfer tube diameter d (mm) | 30 to 40 |
| heat transfer tube pitch P (mm) | 75 to 90 |
| number of stages of heat transfer tubes (stages) | ≧3 |

The inter-tube flow rate of the bare tubes 12-1 indicates the flow rate of the gas which passes through the space part corresponding to the area obtained by subtracting the projected cross sectional area of the bare tubes 12-1 in the gas flow direction from the cross sectional view of the duct on the center axis L of the heat transfer tubes of the first stage in the gas flow direction in the heat transfer tube arrangement shown in FIG. 2.

Next, the simplified view of the bundles of the GGH heat transfer tubes of the present embodiment will be shown.

Figure 3:
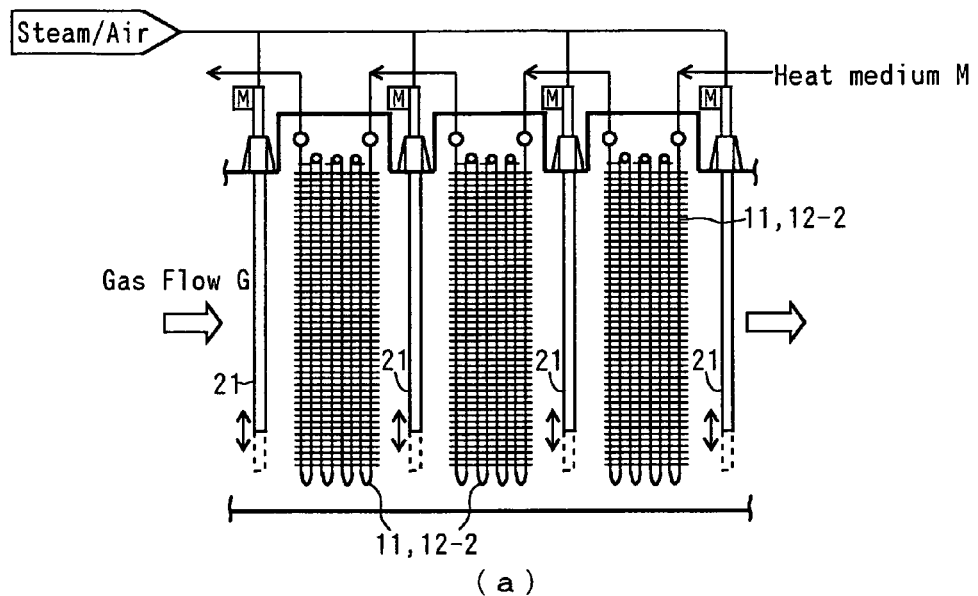
FIG. 3 shows block diagrams of the GGH heat transfer tubes of the embodiment of the present invention.
Figure 3:
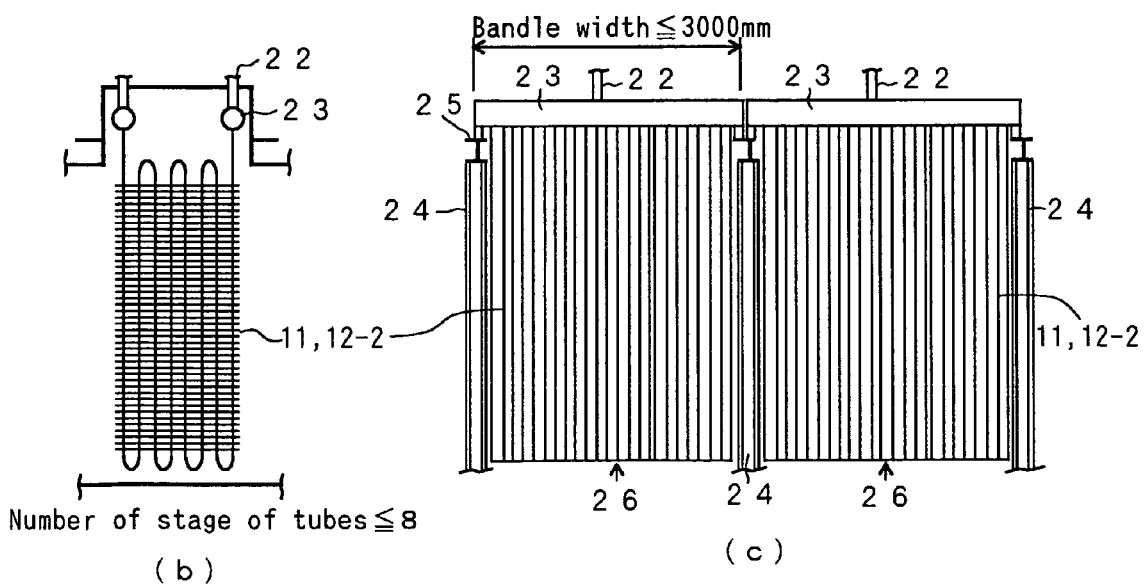

FIG. 3 is an example of bundles formed into blocks by combining the heat transfer tubes, as the constitutional unit of the heat transfer tubes (fin-equipped heat transfer tubes) 11 and 12-2 which flow the heat medium M used in the GGH heat recovery device 4 and the re-heater 8. FIG. 3 shows simplified views of an upright structure (pendant type) of the heat transfer tube bundles of the GGH: FIG. 3(a) shows a side view of the heat transfer tube bundles in the direction of the exhaust gas flow; FIG. 3(b) is a partly enlarged view of FIG. 3(a); and FIG. 3(c) is a side view of the heat transfer tube bundles in the direction orthogonal to the exhaust gas flow.

In order to improve the dust removing effects of the soot blowers 21, each bundle shown in FIG. 3 is structured in such a manner as to have eight or less stages in the gas flow direction and to have a bundle width (the width in the direction orthogonal to the gas flow) of not more than 3000 mm, and the soot blowers 21 are installed in front and in back of each bundle in the direction of the exhaust gas flow.

As shown in FIG. 3, each heat transfer tube bundle is suspended from headers 23 placed on the bundle support beams 25 provided over reinforcing columns 24. The headers 23 are connected with nozzles 22 for heat transfer tube headers.

Thus forming the GGH heat transfer tube bundles into an upright structure (pendant type) decreases the number of inner supports to be installed in the GGH, thereby reducing the total weight of the GGH. Moreover, the installing operation of the GGH becomes easy, making the on-site installation work comparatively easy.

FIG. 4(a), FIG. 4(b), FIG. 5(a), and FIG. 5(b) show structures which are respectively provided with differential pressure gauges 27 and thermometers 28 installed in front and in back of each heat transfer tube bundle of the GGH of the present embodiment in the gas flow direction, and also provided with control devices 31 for controlling the driving of the motors 32 of the soot blowers 21 by signals from these measuring means 27 and 28.

The soot blowers 21, which are the dust removers of the heat transfer tubes, are activated by timer control or the like at a frequency of 3 to 5 times a day. With such control, the soot blowers 21 are operated at a frequency of activation based on the worst conditions assumed so as to prevent the dust adhered to the heat transfer tubes from clogging in the regions between the adjacent heat transfer tubes. This tends to cause the introduction of an excessive amount of steam.

Figure 4:
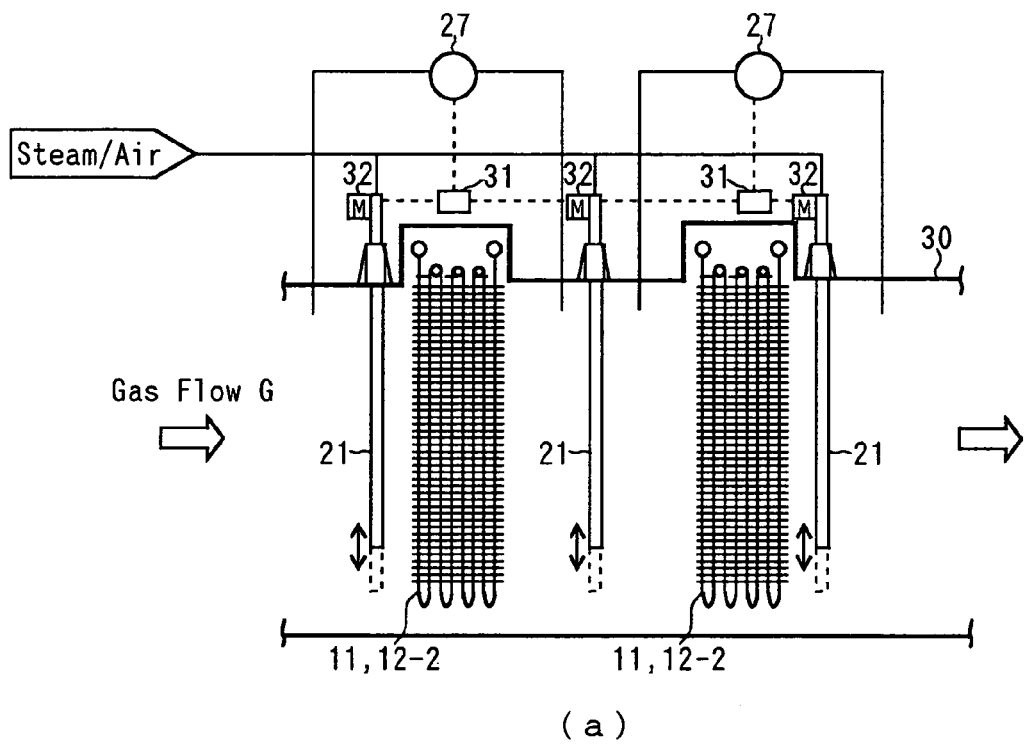
FIG. 4 shows structural diagrams where there are means for measuring differential pressure values or temperatures provided in front and in back of each of the GGH bundles of the embodiment of the present invention.
Figure 4:
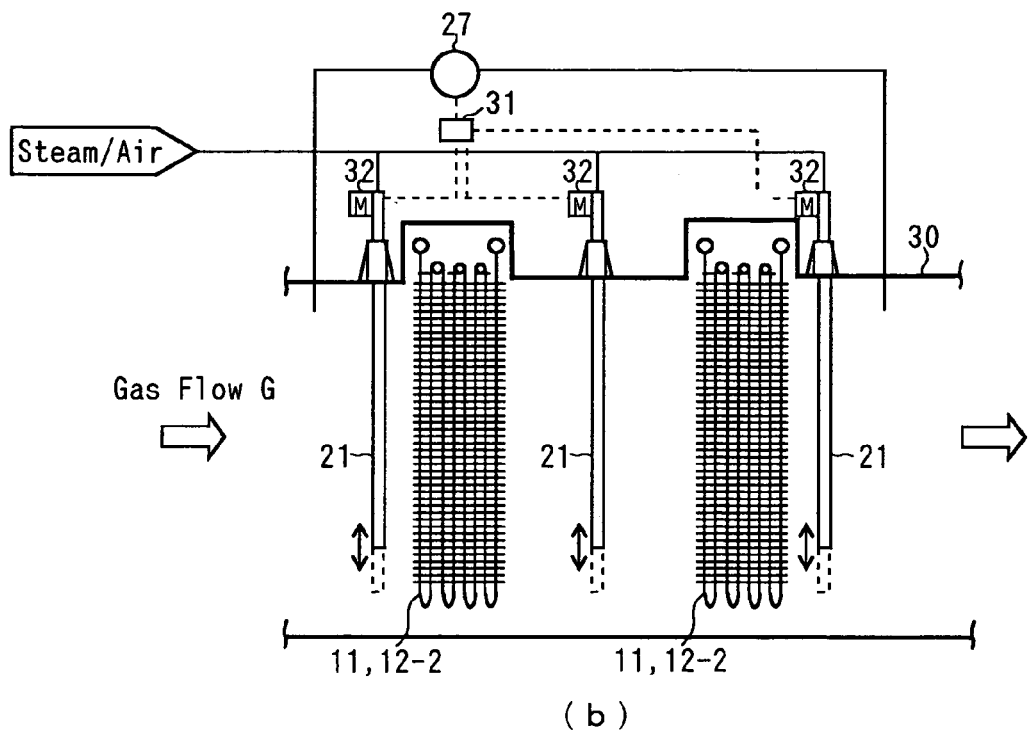
Figure 5:
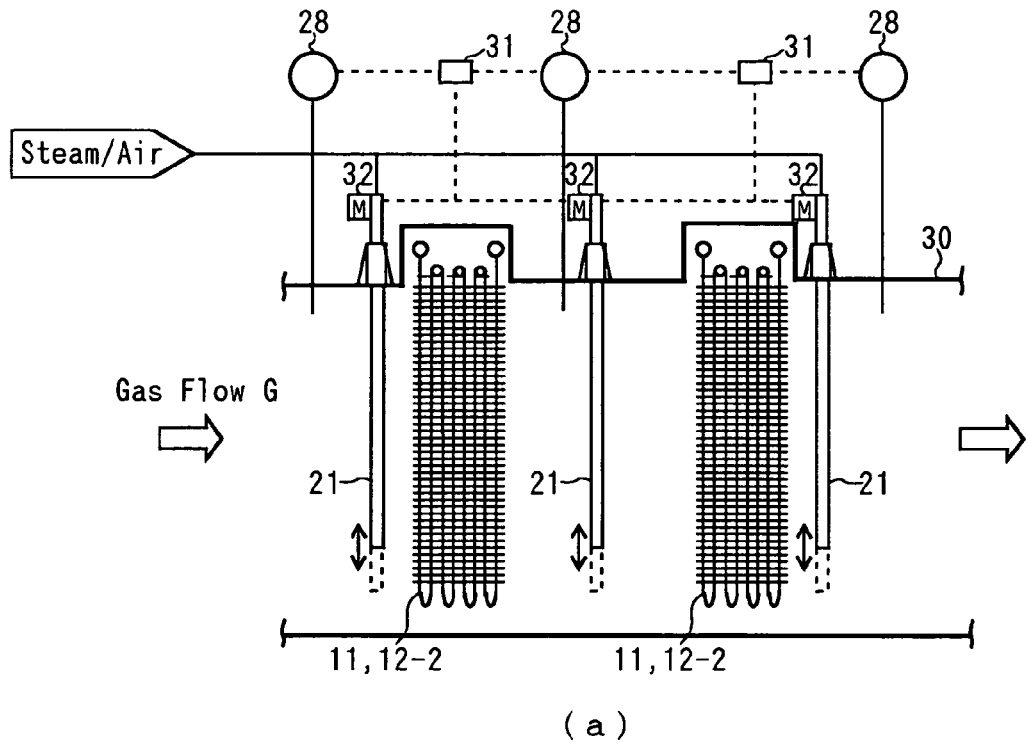
FIG. 5 shows structural diagrams where there are means for measuring differential pressure values or temperatures provided in front and in back of each of the GGH bundles of the embodiment of the present invention.
Figure 5:
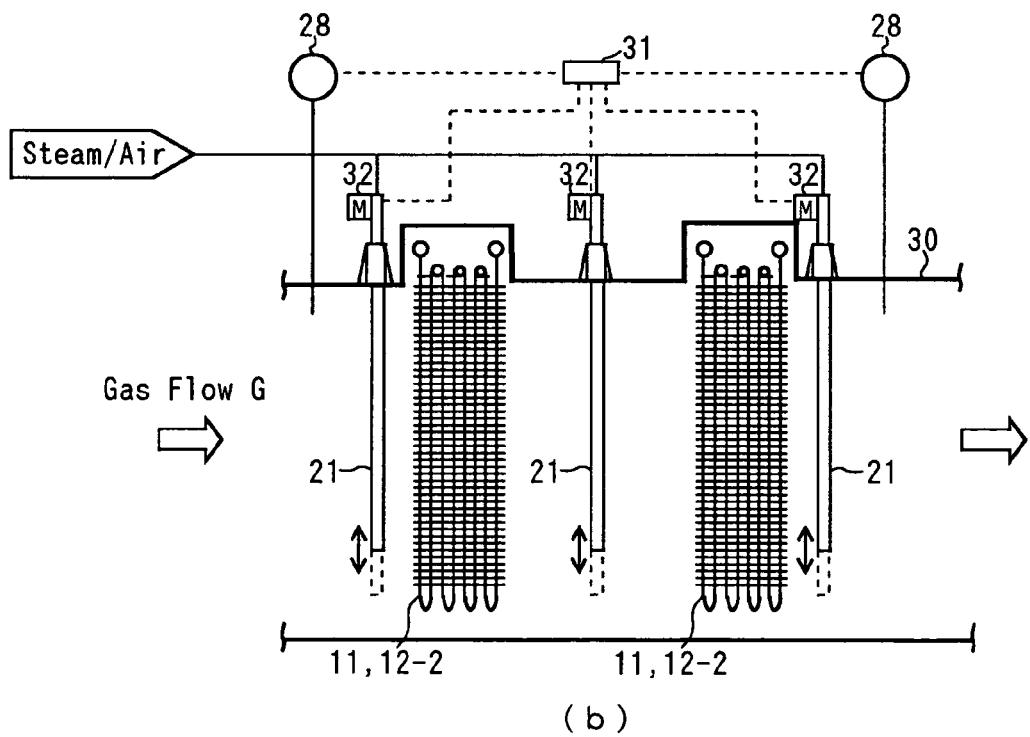
Figure 6:
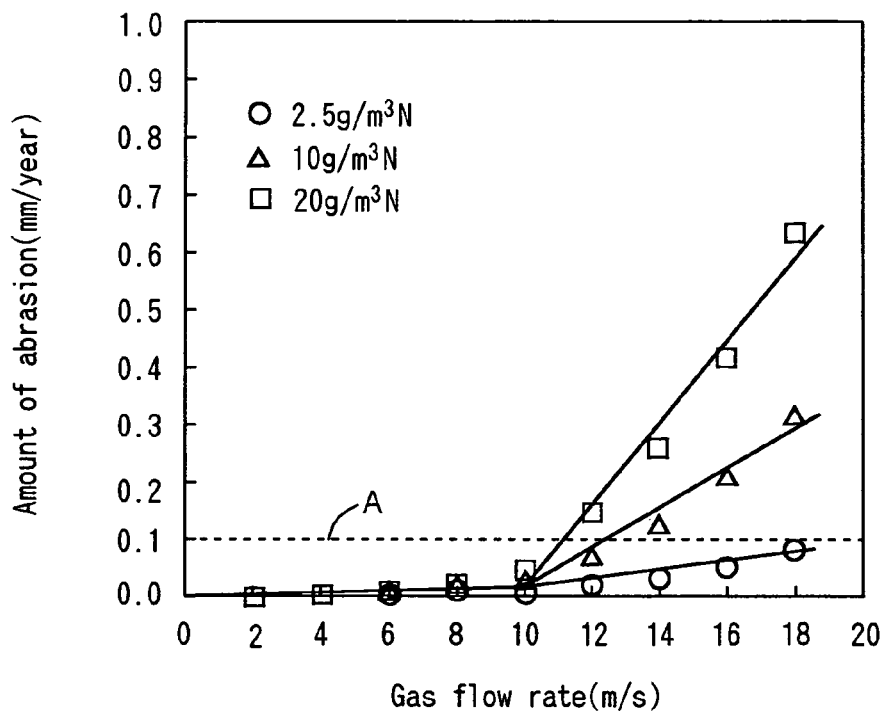
FIG. 6 shows the relationship between the amount of abrasion, the gas flow rate, and the dust concentration in the heat transfer tubes of the embodiment of the present invention.
Figure 7:
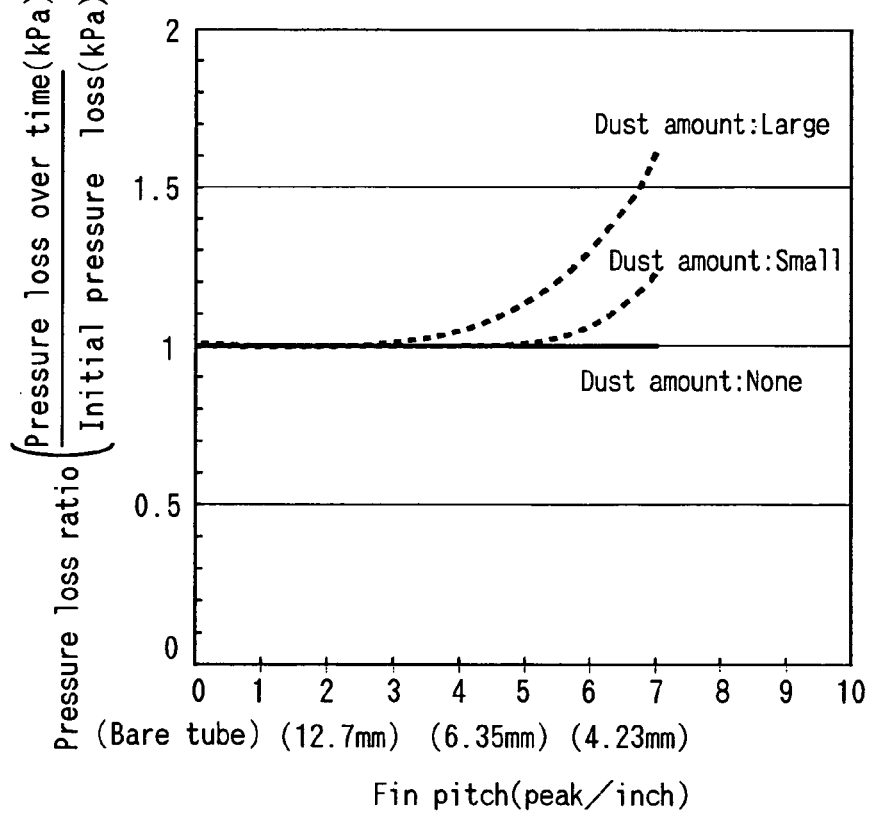
FIG. 7 shows the relationship between the fin pitch and the pressure loss of the embodiment of the present invention.
Figure 8:
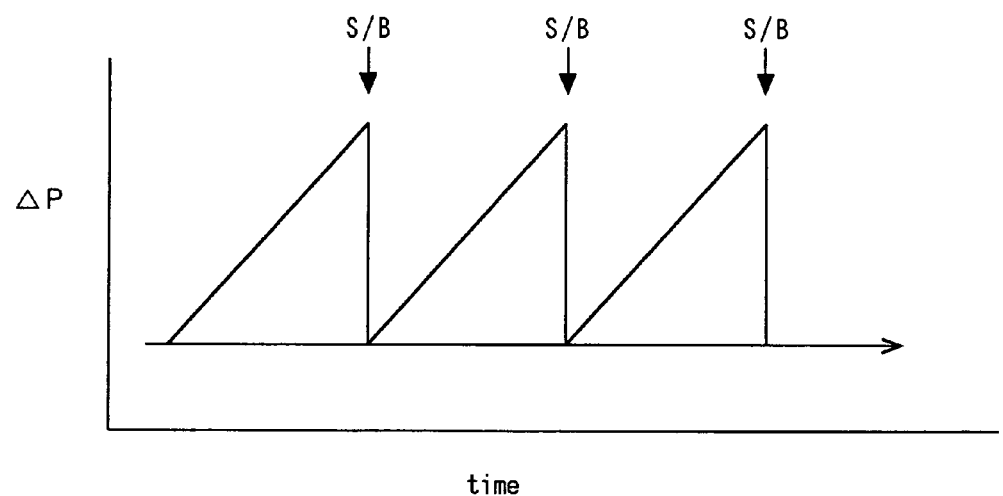
FIG. 8 shows changes over time in pressure loss of the heat transfer tube part of the embodiment of the present invention.
Figure 8:
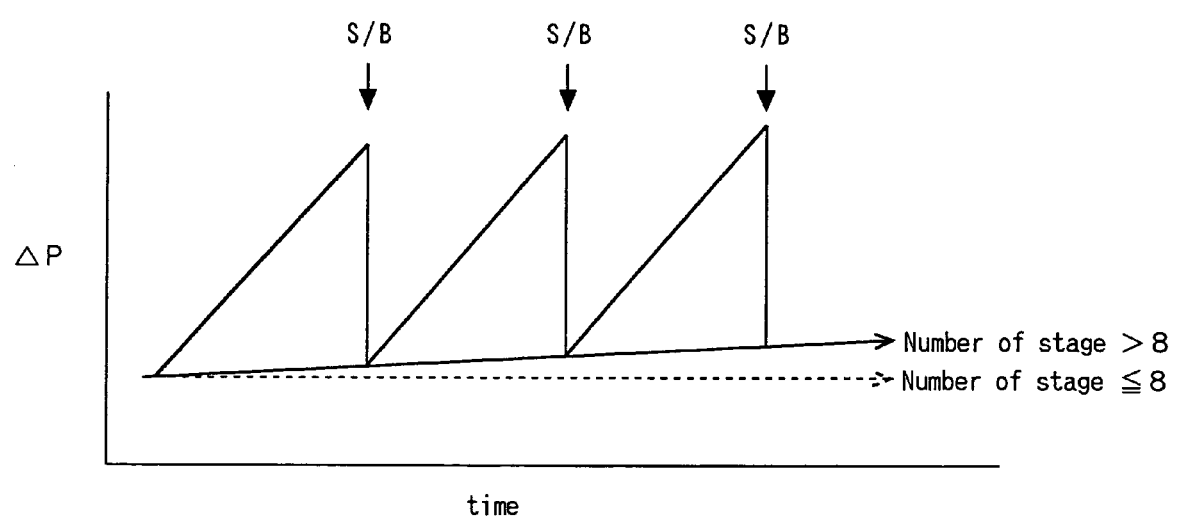
Figure 9:
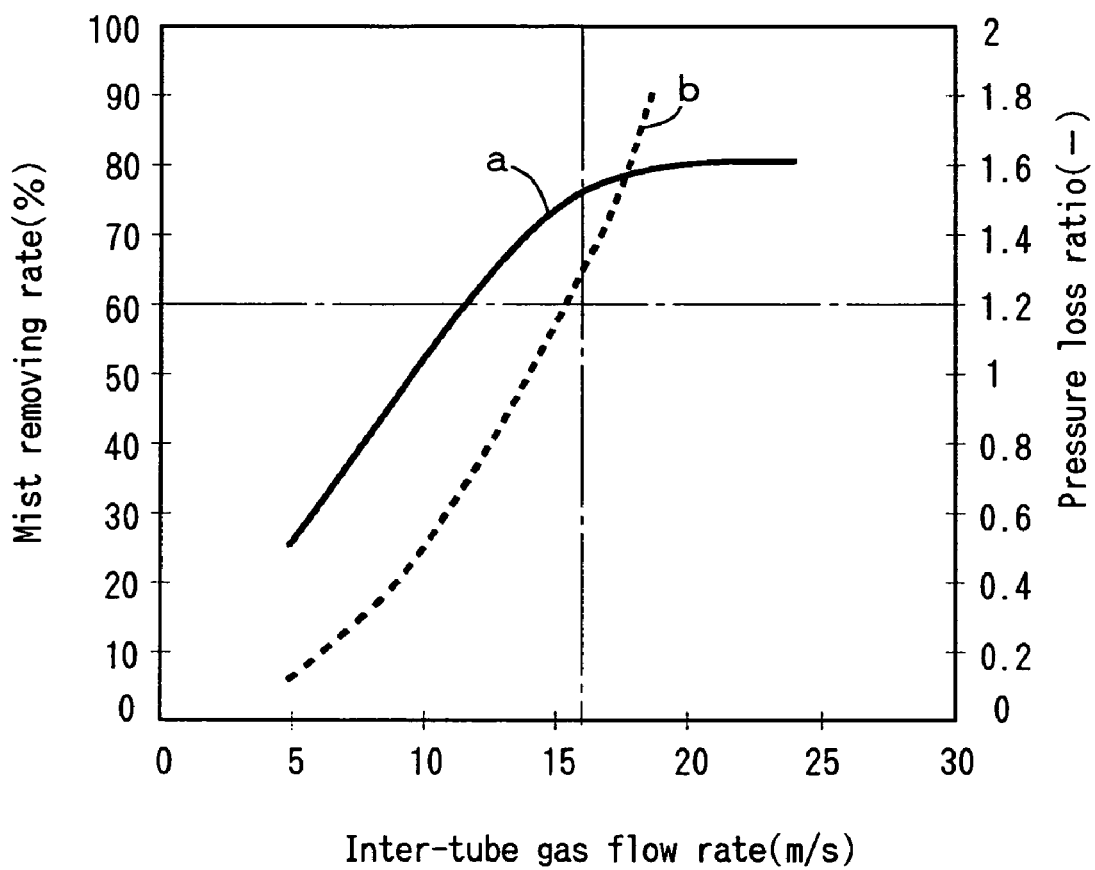
FIG. 9 shows the relationship between the gas flow rate, the pressure loss, and the mist removing performance in the bare tube part of the embodiment of the present invention.

In view of this problem, in the embodiment shown in FIG. 4, the soot blowers 21 are activated when the differential pressure values of the differential pressure gauges 27 or the temperatures of the thermometers 28 reach prescribed values or higher (or lower).

INDUSTRIAL APPLICABILITY

As described hereinbefore, in the structure of an exhaust gas processing system provided with a gas-gas heat exchanger (GGH) as means for removing soot dust and sulfur oxide contained in the exhaust gas emitted from a boiler or the like and for re-heating the exhaust gas emitted from the exhaust flue, the application of the specification and structure of the GGH heat transfer tubes according to the present invention makes it possible to reduce abrasion and corrosion of the fins over time, and also clogging of the regions between the adjacent fins and between the adjacent heat transfer tubes due to the adhesion of the dust, $SO_3$, and absorber, which realizes a stable operation in the device for processing the exhaust gas emitted from the boiler and the like.

Furthermore, as a method for operating the soot blowers as dust removers of the GGH, it is possible that the amount of utility used can be minimized by activating the soot blowers when the differential pressure values and the temperatures in front and in back of each of the GGH re-heater bundles in the gas flow direction reach prescribed values or higher (or lower).

What is claimed is:

1. An exhaust gas processing device comprising:
   an air preheater for preheating air for combustion in a combustion device by using an exhaust gas emitted from the combustion device;
   a gas-gas heater heat recovery device comprising heat transfer tubes for recovering the heat of the exhaust gas at a outlet of the air preheater to a heat medium;
   a dust collector for collecting dust in the exhaust gas at an outlet of the gas-gas heater heat recovery device;
   a wet-type desulfurization device for removing sulfur oxide in the exhaust gas at an outlet of the dust collector;
   a gas-gas heater re-heater comprising heat transfer tubes for heating the exhaust gas at an outlet of the wet-type desulfurization device by using the heat medium supplied from said gas-gas heater heat recovery device;
   at least some of the heat transfer tubes of the gas-gas heater are composed of fin-equipped heat transfer tubes, and the fin pitch of the heat transfer tubes of the gas-gas heater heat recovery device being set at 7.25 to 10.16 mm, and the fin pitch of the heat transfer tubes of the gas-gas heater re-heater being set at 6.35 to 8.47 mm;
   being arranged in that order from an upstream side to a downstream side of an exhaust gas duct of the combustion device; and
   a heat medium circulation line for connecting heat transfer tubes provided in each of the gas-gas heater heat recovery device and the gas-gas heater re-heater and for circulating the heat medium through the heat transfer tubes, wherein
   the heat transfer tubes of the gas-gas heater heat recovery device are squarely arranged in the gas flow direction in such a manner that the inter-tube flow rate, which is the flow rate of the exhaust gas between the heat transfer tubes adjacent in the direction orthogonal to the gas flow direction, can be less than 10 m/s.

2. The exhaust gas processing device according to claim 1, wherein the dust collector of the wet type is disposed between the wet-type desulfurization device and the gas-gas heater re-heater in the exhaust gas duct.

3. The exhaust gas processing device according to claim 1, wherein at least three stages of the heat transfer tubes comprising a bare tube are installed on the stage preceding the fin-equipped heat transfer tubes of the gas-gas heater re-heater, and said bare tube is staggered arrangement in the gas flow direction so that the inter-tube flow rate, which is the flow rate of the exhaust gas between the heat transfer tubes adjacent in the direction orthogonal to the gas flow direction, cannot be more than 12 to 16 m/s.

4. The exhaust gas processing device according to claim 3, wherein the heat transfer tubes comprising the bare tube installed in the stage preceding the fin-equipped heat transfer tubes of the gas-gas heater re-heater are either made a part of the heat medium circulation line for circulating the heat medium through the gas-gas heater heat recovery device and the gas-gas heater re-heater, or made a steam line for flowing steam that is installed separately from said heat medium circulation line.

5. The exhaust gas processing device according to claim 1, wherein the heat transfer tubes of the gas-gas heater heat recovery device are tied in bundles each having a prescribed number of heat transfer tubes; the bundles are each comprising heat transfer tubes of not more than eight stages arranged in the gas flow direction and have a width of 3000 mm or less in the direction orthogonal to the gas flow direction, and in front and in back of the bundles in the gas flow direction are installed dust removers.

6. The exhaust gas processing device according to claim 4, wherein either the gas-gas heater heat recovery device or the gas-gas heater re-heater is provided with dust removers; differential pressure gauges and/or thermometers are provided in front and in back of the bundles in the gas flow direction; and control devices are provided to activate the dust removers when the measured values of the differential pressure gauges and/or the thermometers become prescribed values or higher or lower.

* * * * *